Jan. 16, 1962 K. KEHDE 3,016,805
CLAMPING ARRANGEMENT
Filed June 16, 1961 2 Sheets-Sheet 1
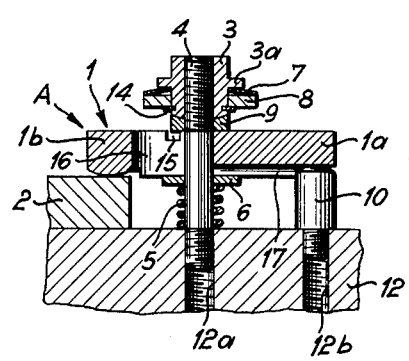
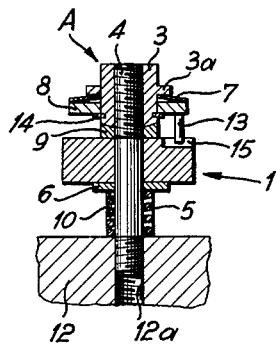
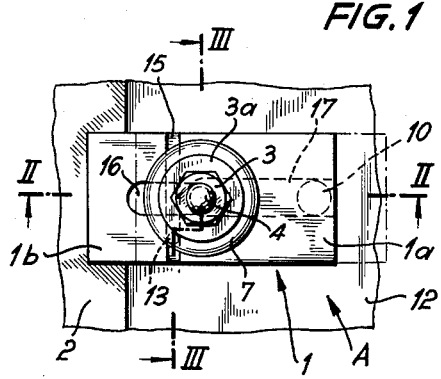
INVENTOR:
KURT KEHDE
BY
Michael S. Striker
his ATTORNEY Jan. 16, 1962 K. KEHDE 3,016,805
CLAMPING ARRANGEMENT
Filed June 16, 1961 2 Sheets-Sheet 2

INVENTOR:
KURT KEHDE
BY
Michael S. Striker
his ATTORNEY

United States Patent Office 3,016,805
Patented Jan. 16, 1962

3,016,805
CLAMPING ARRANGEMENT
Kurt Kehde, Gesundheitstr. 22, Remscheid, Germany
Filed June 16, 1961, Ser. No. 117,748
Claims priority, application Germany June 20, 1960
17 Claims. (Cl. 269—157)

The present invention relates to a clamping arrangement for holding a workpiece in position in a machine tool or the like. More particularly, the invention relates to a clamping arrangement whose work-engaging clamping member may perform more than one movement with respect to the workpiece including a substantially linear movement toward and away from that surface of the workpiece which is to be or which was engaged by the clamping member and a second movement in a plane substantially perpendicular to the direction of first movement.

An important object of the present invention is to provide a clamping arrangement of the just outlined characteristics which is constructed and assembled in such a way that the second movement automatically follows the first movement or vice versa when the clamping member is respectively disengaged from or moved into engagement with a workpiece.

Another object of my invention is to provide a clamping arrangement which is suitable for retention of differently configurated or dimensioned workpieces and which is especially suited for retention of identically constructed and configurated workpieces in a mass-manufacturing plant.

A further object of the invention is to provide a clamping arrangement of the above described type which is capable of very rapidly engaging or releasing a workpiece, which comprises a small number of component parts, whose clamping or work-retaining force may be varied within any desired range, and which may be conveniently installed in all types of machine tools including drilling machines, grinding machines, milling machines, planing machines, turning machines, welding apparatus, broaching machines, apparatus in which a work cannot be properly supported by rigidly mounted clamps or stops, precision measuring apparatus, apparatus for the manufacture of gauges or similar precision instruments, and many others.

An additional object of the invention is to provide a clamping arrangement whose clamping member is automatically moved to a predetermined position with respect to the workpiece whenever the clamping arrangement is in operative or idle position.

A concomitant object of my invention is to provide a clamping arrangement of the above outlined characteristics which is capable of properly retaining a workpiece even if chips, shavings or other foreign particles happen to penetrate between its parts.

An additional object of the invention is to provide a clamping arrangement which may be conveniently and rapidly taken apart for inspection, cleaning or replacement of its components.

With the above objects in view, the invention resides in the provision of a clamping arrangement which comprises a main supporting means, e.g. the work-supporting bedplate of a machine tool, an elongated carrier which is secured to and projects from the bedplate and has an externally threaded portion, a clamping member which has an end portion adapted to clampingly engage a workpiece placed onto the bedplate and which is mounted on the carrier so as to be movable longitudinally of the carrier toward and away from the bedplate as well as in a plane substantially perpendicular to the longitudinal extension of the carrier, means for permanently biasing the clamping member in the longitudinal direction of the carrier and away from the bedplate so as to disengage the clamping member from the workpiece, operating means comprising an internally threaded rotary nut meshing with the carrier for moving the clamping member toward the bedplate and into engagement with the workpiece, and for permitting the biasing means to move the clamping member away from the workpiece, and motion transmitting means preferably in the form of a friction clutch operating between the clamping member and the nut for moving the clamping member in the aforementioned plane in response to rotation of the nut subsequent to disengagement of the clamping member from the workpiece under the action of the biasing means.

The clamping member may be formed with an elongated closed slot through which the carrier extends, and the motion transmitting means then comprises a ring frictionally engaging with the nut and having a pin-and-groove or a like connection with the clamping member for linearly displacing the clamping member in the longitudinal direction of the slot when the nut is rotated after the clamping member is already disengaged from the workpiece. Alternately, the clamping member may be rotatably mounted on the carrier and is rotated by the ring once it is disengaged from the workpiece.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a top plan view of a clamping arrangement embodying one form of my invention, showing in phantom lines the retracted or idle position of the clamping member;

FIG. 2 is a longitudinal central section through the clamping arrangement as seen in the direction of arrows from the line II—II of FIG. 1;

FIG. 3 is a transverse section through the clamping arrangement as seen in the direction of arrows from the line III—III of FIG. 1;

Figure 4:
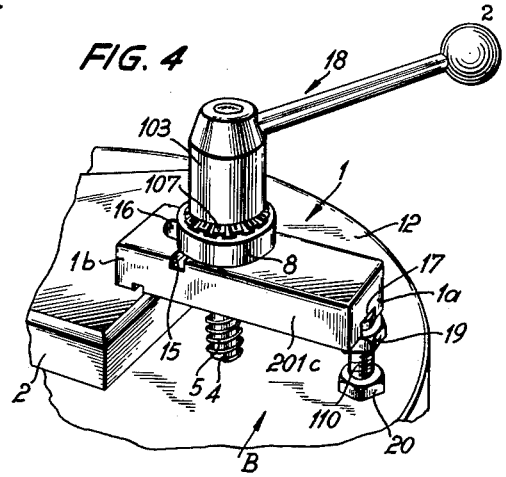
FIG. 4 is a perspective view of a clamping arrangement which is provided with an operating handle.

Referring now in greater detail to the illustrated embodiments, and first to FIGS. 1 to 3, there is shown a clamping arrangement A which comprises a main supporting means here shown as a work-supporting base plate or bedplate 12 forming part of a machine tool or the like in which the clamping arrangement is put to use. The bedplate 12 is formed with a tapped bore 12a which receives the screwthreaded lower end portion of a vertically adjustable elongated bolt-like carrier 4 for a substantially flat elongated clamping member 1. The latter is formed with an elongated closed slot 16 through which the median portion of the bolt 4 extends. The underside of the clamping member 1 is formed with an elongated comparatively shallow recess or channel 17 which preferably extends all the way to the rear end face of the clamping member and receives the preferably convex head of a vertically adjustable and preferably exchangeable combined propping element and guide means here shown as a stud 10 whose screwthreaded lower end portion 10a is received in a tapped bore 12b of the bedplate. The head of the stud 10 bears against the rear end portion 1a of the clamping member 1 and cooperates with an operating means in the form of an internally threaded rotary member or clamping nut 3 to press the forward end portion or nose 1b of the clamping member into retaining or clamping engagement with a workpiece 2 which rests on the bedplate 12. The channel 17 is parallel with the slot 16, and the length of the slot 16 is such that the clamping member 1 may be shifted rearwardly in a plane substantially perpendicular to the longitudinal extension of the bolt 4 to assume the phantom-line position 1' in which its nose 1b is moved off the workpiece 2.

The nut 3 meshes with the screwthreaded upper end portion of the bolt 4 and acts as a means for respectively pressing the end portions 1a, 1b of the clamping member into engagement with the stud 10 and with the workpiece 2. A biasing means in the form of a helical expansion spring 5 which surrounds the median portion of the bolt 4 is provided between the bedplate 12 and the underside of the clamping member 1. The upper end of this spring bears against a washer 6 which is adjacent to the underside of the clamping member so as to immediately lift the nose 1b off the upper side of the workpiece 2 as soon as the operator begins to unscrew the nut 3. In addition, the spring 5 prevents the clamping member 1 from descending onto the bedplate 12 upon removal of the workpiece and upon accidental turning of the clamping member to such an extent that the head of the stud 10 is not received in the recess 17 but is adjacent to the one or to the other lateral or side face of the clamping member. In other words, the spring 5 urges the clamping member upwardly and toward the nut 3. A spherical washer 9 is provided on the bolt 4 between the upper side of the clamping member 1 and the complementary lower end face of the nut 3 so as to insure full face-to-face engagement between the parts 3 and 9 and proper distribution of stresses even if the operator should forget to properly adjust the stud 10 or even if some chips, shavings or other foreign matter should penetrate between the head of the stud and the bottom wall of the guide channel 17. It will be readily understood that the washer 9 may be formed with a convex upper face which then engages with a concave lower end face of the nut 3.

Adjacent to its upper end, the nut 3 is provided with an external flange 3a which serves as an abutment for a second biasing means here shown as a dished spring 7 which bears against the upper side of a motion transmitting ring 8. This ring forms with the spring 7 a friction clutch which can transform rotary movement of the nut 3 into longitudinal movement of the clamping member 1. The ring 8 carries a downwardly extending pin shaped follower 13 which projects into a transversely extending groove 15 provided in the upper side of the clamping member 1. The pin 13 is preferably located close to the periphery of the ring 8 and may be received with some play in the groove 15. The longitudinal extension of the groove 15 preferably encloses an angle of 90 degrees with the longitudinal extension of the slot 16 and recess 17, and the axis of the pin 13 is normally parallel with the axis of the bolt 4.

The operation of the clamping arrangement A is as follows:

In the full-line position of FIGS. 1 to 3, the clamping member 1 is pressed against the upper side of the workpiece 2 and against the head of the stud 10 because the nut 3 is drawn tight. However, when the operator applies a suitable tool and begins to rotate the nut in anticlockwise direction, as viewed in FIG. 1, the spring 5 begins to lift the clamping member 1 away from the upper side of the workpiece 2 so that the clamping member may be longitudinally displaced to the position 1' because the bias of the spring 7 is sufficient to compel the ring 8 to rotate with the nut 3 and to thereby transform its own angular movement into longitudinal movement of the clamping member through the pin-and-groove connection 13, 15. The movement of the clamping member 1 under the action of the pin-and-groove connection 13, 15 takes place in a plane which is substantially perpendicular to the axis of the bolt 4. In other words, a rotary movement of the nut 3 brings about automatic movement of the clamping member 1 in a direction away from the upper side of the workpiece axially of the bolt 4, and a subsequent automatic movement of the clamping member in a direction and in a plane at right angles to the axis of the bolt 4, i.e. laterally away from the workpiece. During the second half of its movement, the clamping member 1 is guided by the head of the stud 10 which still extends into the recess 17. The compression or deformation of the spring 7 remains unchanged at all times because the distance between the ring 8 and flange 3a is constant.

The operation is reversed when a workman desires to return the clamping member 1 to its operative position, i.e. when the nut 3 is rotated in clockwise direction, as viewed in FIG. 1. In the first stage, the pin 13 entrains the clamping member from its phantom-line position 1' to its full-line position because the spring 7 compels the ring 8 to rotate with the nut 3 since a comparatively small frictional force between the ring 8 and the spring 7 is sufficient to rotate the ring and to thereby shift the clamping member through the pin-and-groove connection 13, 15 back to the full-line position of FIGS. 1 or 2 as long as the clamping member is prevented by the spring 5 from engaging the workpiece. In the second stage, i.e. when the clamping member returns to the position of FIG. 2 and its nose 1b is located above the upper side of the workpiece, the rear end wall of the slot 16 prevents the clamping member from continuing its longitudinal movement under the action of the pin 13 so that the ring 8 cannot participate in rotary clockwise movement of the nut 3. If the operator continues to rotate the nut 3 in clockwise direction, the washer 9 presses the clamping member into retaining engagement with the workpiece, the retaining force of the clamping member depending on the extent to which the nut 3 is drawn tight. As a rule, the pin 13 will shift the clamping member 1 to the phantom-line position 1' before the spring 5 can cause the clamping member to become disengaged from the head of the stud 10, i.e. before the recess 17 is lifted above the head of the stud.

If it is desired to replace the clamping member 1 by a clamping member having a shorter or a longer slot 16, the operator merely unscrews the nut 3 and thereupon removes the washer 9. It will be noted that the nut 3, the spring 7, the ring 8 and the split ring 14 may be removed or applied as a unit.

The operator will adjust the stud 10 whenever the workpiece 2 is replaced by a workpiece of different thickness. It is preferred to move the stud 10 to such a position that the length of its portion projecting above the bedplate 12 minus the depth of the recess 17 equals or at least approximates the thickness of the workpiece provided, of course, that the underside of the nose 1b is coplanar with the underside of the rear end portion 1a.

FIG. 4 illustrates a slightly modified clamping arrangement B wherein the nut 3 is replaced by a nut 103 provided with an operating handle 18. The spring 7 is replaced by a pronged spring 107 which bears against the ring 8. The clamping arrangement B utilizes a slightly different stud 110 which is provided with external threads to mesh with a height-adjusting nut 19. This nut 19 comes into abutment with the rear end portion 1a of the clamping member 1 when the nut 103 is drawn tight. A lock nut 20 prevents unintentional axial displacements of the stud 110. The nut 19 is provided for convenient precision adjustment of the clamping member 1 without necessitating a rotation of the stud 110. The operation of the arrangement B is identical with that of the clamping arrangement A excepting that no special tools are necessary for moving the clamping member to its operative or idle position because the nut 103 is permanently connected with the operating handle 18. The nut 3 of FIGS. 1–3 is preferred when the handle 18 could interfere with the operation of the machine tool in which the clamping arrangement is installed. Also, the workpiece may be clamped with a greater force if the nut 3 is engaged by a wrench or a like tool. The preferably short handle 18 is not always sufficient for the transmission of very large clamping forces. Of course, the operator may always replace the nut 103 by the nut 3 or vice versa. An important advantage of the handle 18 is that it can speed up the clamping and removal of identical workpieces in a mass manufacturing operation because the engagement of the nut 3 by a wrench or a like tool obviously requires more time than the manipulation of a handle which is permanently connected with the nut. It will be noted that the nut 103 is without a pronounced flange such as the flange 3a of FIGS. 1–3.

Figure 5:
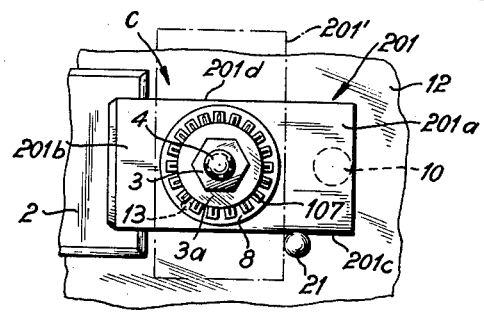
FIG. 5 is a top plan view of a different clamping arrangement whose clamping member is turnable through about 90 degrees, the idle position of the clamping member being shown in phantom lines.
Figure 6:
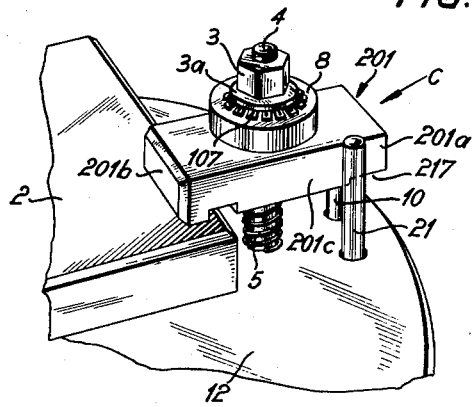
FIG. 6 is a perspective view of the clamping arrangement shown in FIG. 5.

FIGS. 5 and 6 illustrate a different clamping arrangement C wherein the clamping member 201 is turnable or pivotable about the axis of the bolt 4 as soon as its nose 201b is lifted upwardly and away from the upper side of the workpiece 2. The slot 16 is replaced by a circular bore (not shown) through which the median portion of the bolt 4 extends. The pin-and-groove connection 13, 15 is modified insofar as the groove may assume the form of a blind bore in the upper side of the clamping member into which the pin 13 extends. An elongated lateral stop 21 is anchored in the bedplate 12 and is adapted to abut against two spaced portions of the lateral face 201c of the clamping member 201. When the clamping member is in its full-line position of FIG. 5, the stop 21 abuts against that portion of the lateral face 201c which extends along the rear end portion 201a. However, when the clamping member is pivoted to its phantom-line inoperative position 201', the stop 21 comes into abutment with that portion of the lateral face 201c which is adjacent to or extends along the nose 201b.

The clamping arrangement C is operated as follows:
In the full-line position of FIG. 5, the nose 201b is in retaining engagement with the upper side of the workpiece 2. When the operator begins to rotate the nut 3 in anticlockwise direction, the spring 5 lifts the nose 201b above and away from the workpiece and simultaneously moves the rear end portion 201a away from the stud 10. The spring 107 produces sufficient friction between the ring 8 and the flange 3a so that the ring, through the pin 13, transmits anticlockwise rotary movement of the nut 3 to the clamping member 201 and turns the latter to the position 201' as soon as the nose 210b is lifted above the workpiece. The recess 17 may be omitted. It will be understood that the nut 3 of the clamping arrangement C may be replaced by a nut 103 of the type shown in FIG. 4.

The stop 21 is preferably mounted in such position that it may permit clockwise and anticlockwise movements of the clamping member through 90 degrees in a plane which is perpendicular to the longitudinal extension of the carrier 4. In the position 201', the clamping member 201 of FIG. 5 permits convenient access to the workpiece because its lateral face 201d is spaced from the workpiece.

When the nut 3 of FIG. 5 is rotated in clockwise direction while the clamping member is in the phantom-line position 201', the ring 8 first returns the clamping member to the full-line position, whereupon a further clockwise rotation of the nut causes the clamping member to engage the workpiece because the lateral face 201c is then in abutment with the stop 21 and prevents further rotary movement of the clamping member so that the nose 201b descends into clamping or retaining engagement with the upper side of the workpiece.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. An arrangement for clamping workpieces in machine tools and the like, comprising in combination, main supporting means; elongated carrier means secured to and projecting from said supporting means and having an externally threaded portion; a clamping member having an end portion adapted to engage a workpiece placed onto said supporting means, said clamping member mounted on said carrier means so as to be movable longitudinally of said carrier means toward and away from said supporting means as well as in a plane substantially perpendicular to the longitudinal extension of said carrier means; means for permanently biasing said clamping member in the longitudinal direction of said carrier means and away from said supporting means so as to disengage the clamping member from the workpiece; operating means comprising an internally threaded rotary member meshing with said carrier means for moving said clamping member toward the supporting means and into engagement with the workpiece, and for permitting said biasing means to move the clamping member away from the workpiece; and motion transmitting means for moving the clamping member in said plane in response to rotation of said rotary member upon disengagement of the clamping member from the workpiece under the action of said biasing means.

2. An arrangement for clamping workpieces in machine tools and the like, comprising in combination, main supporting means; elongated carrier means secured to and projecting from said supporting means and having an externally threaded portion; a clamping member having an end portion adapted to engage a workpiece placed onto said supporting means, said clamping member mounted on said carrier means so as to be movable longitudinally of said carrier means toward and away from said supporting means as well as in a plane and in a direction substantially perpendicular to the longitudinal extension of said carrier means, said clamping member having an elongated slot through which said carrier means extends; means for permanently biasing said clamping member in the longitudinal direction of said carrier means and away from said supporting means so as to disengage the clamping member from the workpiece; operating means comprising an internally threaded rotary member meshing with said carrier means for moving said clamping member toward the supporting means and into engagement with the workpiece, and for permitting said biasing means to move the clamping member away from the workpiece; and motion transmitting means for moving the clamping member in said plane in response to rotation of said rotary member upon disengagement of the clamping member from the workpiece under the action of said biasing means, said motion transmitting means comprising a ring rotatably mounted on said rotary member, a friction producing spring for normally compelling the ring to rotate with said rotary member, and a pin-and-groove connection between said ring and said clamping member for moving the clamping member in said plane in the longitudinal direction of said slot in response to rotation of said rotary member and upon disengagement of the clamping member from the workpiece.

3. An arrangement for clamping workpieces in machine tools and the like, comprising in combination, main supporting means; elongated carrier means secured to and projecting from said supporting means and having an externally threaded portion; a clamping member having an end portion adapted to engage a workpiece placed onto said supporting means, said clamping member mounted on said carrier means so as to be movable longitudinally of said carrier means toward and away from said supporting means as well as for rotating the clamping member in a plane substantially perpendicular to the longitudinal extension of said carrier means, said clamping member rotatable on said carrier means; means for permanently biasing said clamping member in the longitudinal direction of said carrier means and away from said supporting means so as to disengage the clamping member from the workpiece; operating means comprising an internally threaded rotary member meshing with said carrier means for moving said clamping member toward the supporting means and into engagement with the workpiece, and for permitting said biasing means to move the clamping member away from the wrokpiece; and motion transmitting means for rotating the clamping member in said plane in response to rotation of said rotary member upon disengagement of the clamping member from the workpiece under the action of said biasing means, said motion transmitting means comprising a ring rotatably mounted on said rotary member, a friction producing spring for normally compelling the ring to rotate with said rotary member, and a pin-and-groove connection between said ring and said clamping member for rotating the clamping member in response to rotation of said rotary member and upon disengagement of the clamping member from the workpiece.

4. A clamping arrangement as set forth in claim 3, further comprising stop means mounted on said supporting means for limiting the rotary movements of said clamping member in two spaced end positions.

5. A clamping arrangement as set forth in claim 4, wherein said clamping member is rotatable through about 90 degrees.

6. A clamping arrangement as set forth in claim 3, wherein said spring is a dished spring.

7. A clamping arrangement as set forth in claim 6, further comprising a spherical washer mounted on said carrier means between said rotary member and said clamping member.

8. A clamping arrangement as set forth in claim 3, wherein said clamping member has a second end portion distant from said first named end portion and disposed at the opposite side of said carrier means, and further comprising propping means secured to said supporting means and engaging said second end portion when the clamping member engages the workpiece.

9. A clamping arrangement as set forth in claim 8, wherein said propping means is a stud which is adjustably mounted in the supporting means so as to be moveable toward and away from the second end portion of said clamping member.

10. A clamping arrangement as set forth in claim 8, wherein said propping means comprises an externally threaded stud and an adjusting nut meshing with said stud and adapted to engage the second end portion of said clamping member.

11. An arrangement for clamping workpieces in machine tools and the like, comprising in combination, main supporting means; elongated carrier means secured to and projecting from said supporting means and having an externally threaded portion; a clamping member having an end portion adapted to engage a workpiece placed onto said supporting means, said clamping member mounted on said carrier means so as to be movable longitudinally of said carrier means toward and away from said supporting means as well as in a plane substantially perpendicular to the longitudinal extension of said carrier means; means for permanently biasing said clamping member in the longitudinal direction of said carrier means and away from said supporting means so as to disengage the clamping member from the workpiece; operating means comprising an internally threaded rotary member meshing with said carrier means for moving said clamping member toward the supporting means and into engagement with the workpiece, and for permitting said biasing means to move the clamping member away from the workpiece; and motion transmitting means for moving the clamping member in said plane in response to rotation of said rotary member upon disengagement of the clamping member from the workpiece under the action of said biasing means, said motion transmitting means comprising a ring rotatably mounted on said rotary member, a friction producing spring between said rotary member and said ring, and a follower-and-groove connection between said ring and said clamping member.

12. An arrangement for clamping workpieces in machine tools and the like, comprising in combination, a bedplate; an elongated carrier secured to and projecting from said bedplate and having an externally threaded portion; a clamping member having an end portion adapted to engage a workpiece placed onto said bedplate, said clamping member mounted on said carrier so as to be movable longitudinally of said carrier toward and away from the bedplate as well as in a plane substantially perpendicular to the longitudinal extension of the carrier; operating means comprising a nut meshing with said carrier and rotatable with respect thereto for moving the clamping member toward the bedplate and into engagement with the workpiece and for permitting the carrier to move away from the workpiece; and motion transmitting means operatively connected with said nut and with said clamping member for moving the clamping member in said plane upon disengagement of the clamping member from the workpiece.

13. An arrangement for clamping workpieces in machine tools and the like, comprising in combination, a bedplate; an elongated carrier secured to and projecting from said bedplate and having an externally threaded portion; a clamping member having a first end portion at one side of said carrier and adapted to engage a workpiece placed onto said bedplate and a second end portion located at the other side of said carrier, said clamping member mounted on said carrier so as to be movable longitudinally of said carrier toward and away from the bedplate as well as in a plane substantially perpendicular to the longitudinal extension of the carrier; operating means comprising a nut meshing with said carrier and rotatable with respect thereto for moving the clamping member toward the bedplate and into engagement with the workpiece and for permitting the carrier to move away from the workpiece; motion transmitting means operatively connected with said nut and with said clamping member for moving the clamping member in said plane upon disengagement of the clamping member from the workpiece; and means secured to said bedplate and extending toward the second end portion of said clamping member for propping said second end portion when the first end portion of said clamping member engages the workpiece.

14. An arrangement for clamping workpieces in machine tools and the like, comprising in combination, a bedplate; an elongated carrier secured to and projecting from said bedplate and having an externally threaded portion; a clamping member having an end portion adapted to engage a workpiece placed onto said bedplate, said clamping member mounted on said carrier so as to be movable longitudinally of said carrier toward and away from the bedplate as well as in a plane substantially perpendicular to the longitudinal extension of the carrier; operating means comprising a nut meshing with said carrier and rotatable with respect thereto for moving the clamping member toward the bedplate and into engagement with the workpiece and for permitting the carrier to move away from the workpiece; motion transmitting means operatively connected with said nut and with said clamping member for moving the clamping member in said plate upon disengagement of the clamping member from the workpiece; a spherical washer rotatably mounted on said carrier between said clamping member and said nut; and means for biasing said clamping member and said washer toward said nut.

15. An arrangement for clamping workpieces in machine tools and the like, comprising in combination, a bedplate; an elongated carrier secured to and projecting from said bedplate and having an externally threaded portion; a clamping member having an end portion adapted to engage a workpiece placed onto said bedplate, said clamping member formed with an elongated slot through which said carrier extends so that the clamping member is movable longitudinally of said carrier toward and away from the bedplate as well as in a direction parallel with said slot and substantially perpendicular to the longitudinal extension of the carrier; operating means comprising a nut meshing with said carrier and rotatable with respect thereto for moving the clamping member toward the bedplate and into engagement with the workpiece and for permitting the carrier to move away from the workpiece; motion transmitting means operatively connected with said nut and with said clamping member for moving the clamping member in said direction upon disengagement of the clamping member from the workpiece; and means comprising a stud fixed to said bedplate and extending into a recess formed in said clamping member for guiding the clamping member in said second direction and for propping the clamping member when the latter engages the workpiece.

16. An arrangement for clamping workpieces in machine tools and the like, comprising in combination, a bedplate; an elongated carrier secured to and projecting from said bedplate and having an externally threaded portion; a clamping member having an end portion adapted to engage a workpiece placed onto said bedplate, said clamping member mounted on said carrier so as to be movable longitudinally of said carrier toward and away from the bedplate as well as in a plane substantially perpendicular to the longitudinal extension of the carrier; operating means comprising a handle and a nut connected with said handle, said nut meshing with said carrier and rotatable by said handle with respect thereto for moving the clamping member toward the bedplate and into engagement with the workpiece and for permittinng the carrier to move away from the workpiece; and motion transmitting means operatively connected with said nut and with said clamping member for moving the clamping member in said plane upon disengagement of the clamping member from the workpiece.

17. An arrangement for clamping workpieces in machine tools and the like, comprising in combination, a bedplate; an elongated carrier secured to and projecting from said bedplate and having an externally threaded portion; a clamping member having an end portion adapted to engage a workpiece placed onto said bedplate, said clamping member mounted on said carrier so as to be movable longitudinally of said carrier toward and away from the bedplate as well as in a plane substantially perpendicular to the longitudinal extension of the carrier; operating means comprising a nut meshing with said carrier and rotatable with respect thereto for moving the clamping member toward the bedplate and into engagement with the workpiece and for permitting the carrier to move away from the workpiece; and motion transmitting means operatively connected with said nut and with said clamping member for moving the clamping member in said plane upon disengagement of the clamping member from the workpiece, said motion transmitting means comprising a split ring element mounted on said nut, a flange element rigid with said nut and spaced from said splint ring element, a second ring rotatably surrounding said nut intermediate said elements, a friction producing spring disposed between one of said elements and said second ring for normally compelling said second ring to participate in rotary movements of the nut, and a motion-transmitting connection between said second ring and said clamping member.

No references cited.